United States Patent
Sadil et al.

(10) Patent No.: US 10,422,532 B2
(45) Date of Patent: Sep. 24, 2019

(54) ATTACHMENT SCHEME FOR A CERAMIC BULKHEAD PANEL

(71) Applicant: United Technologies Corporation, Hartford, CT (US)

(72) Inventors: Andreas Sadil, Newington, CT (US); Jonathan M. Jause, Vernon, CT (US); Alexander Broulidakis, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 779 days.

(21) Appl. No.: 14/909,226

(22) PCT Filed: Jul. 22, 2014

(86) PCT No.: PCT/US2014/047552
§ 371 (c)(1),
(2) Date: Feb. 1, 2016

(87) PCT Pub. No.: WO2015/017180
PCT Pub. Date: Feb. 5, 2015

(65) Prior Publication Data
US 2016/0186997 A1    Jun. 30, 2016

Related U.S. Application Data

(60) Provisional application No. 61/860,985, filed on Aug. 1, 2013.

(51) Int. Cl.
*F23R 3/60* (2006.01)
*F23R 3/00* (2006.01)
(Continued)

(52) U.S. Cl.
CPC ............. *F23R 3/007* (2013.01); *F02C 7/16* (2013.01); *F02C 7/18* (2013.01); *F02C 7/20* (2013.01);
(Continued)

(58) Field of Classification Search
CPC ............. F23R 3/60; F23R 3/50; F02C 7/20
See application file for complete search history.

(56) References Cited

U.S. PATENT DOCUMENTS 3,751,909 A * 8/1973 Kohler ............... F01D 5/148
                                                415/115
4,414,816 A    11/1983 Craig et al.
(Continued)

FOREIGN PATENT DOCUMENTS

DE    19730751        1/1998
DE    19730751 A1 *  1/1998  ............... F23M 5/02
(Continued)

OTHER PUBLICATIONS

International Search Report on Patentability for Application No. PCT/US2014/047552 dated Feb. 11, 2016.
(Continued)

*Primary Examiner* — Steven M Sutherland
*Assistant Examiner* — Marc J Amar
(74) *Attorney, Agent, or Firm* — Carlson, Gaskey & Olds, P.C.

(57) ABSTRACT

A turbine engine includes a compressor section, a combustor in fluid communication with the compressor section, and a turbine section in fluid communication with the combustor section. The combustor includes a combustor region defined by at least one bulkhead panel and at least one heat shielding panel inside the combustor region. The at least one heat shielding panel is connected to the bulkhead panel via at least one cooled fastener.

10 Claims, 6 Drawing Sheets

(51) Int. Cl.
  *F02C 7/16* (2006.01)
  *F02C 7/20* (2006.01)
  *F02C 7/24* (2006.01)
  *F02C 7/18* (2006.01)
  *F23R 3/10* (2006.01)
  *F23R 3/50* (2006.01)
  *F16B 21/16* (2006.01)

(52) U.S. Cl.
  CPC ............... *F02C 7/24* (2013.01); *F16B 21/16* (2013.01); *F23R 3/002* (2013.01); *F23R 3/10* (2013.01); *F23R 3/50* (2013.01); *F23R 3/60* (2013.01); *F05D 2220/32* (2013.01); *F05D 2240/35* (2013.01); *F05D 2260/30* (2013.01); *F23R 2900/00017* (2013.01); *F23R 2900/03043* (2013.01); *Y02T 50/675* (2013.01)

(56) References Cited

U.S. PATENT DOCUMENTS

| | | | | |
|---|---|---|---|---|
| 4,749,298 | A * | 6/1988 | Bundt | F02K 1/82 165/134.1 |
| 5,129,231 | A * | 7/1992 | Becker | F23R 3/10 60/754 |
| 5,129,447 | A * | 7/1992 | Hamner | F02K 1/80 165/134.1 |
| 5,419,115 | A | 5/1995 | Butler et al. | |
| 5,687,572 | A | 11/1997 | Schrantz et al. | |
| 5,755,093 | A * | 5/1998 | Palusis | F02K 1/002 60/266 |
| 5,957,067 | A * | 9/1999 | Dobbeling | F23M 5/02 110/336 |
| 6,164,075 | A * | 12/2000 | Igarashi | F23R 3/005 60/752 |
| 6,341,485 | B1 * | 1/2002 | Liebe | F23R 3/002 60/772 |
| 7,581,301 | B2 * | 9/2009 | Arbona | B62D 29/048 29/525.02 |
| 7,849,696 | B2 * | 12/2010 | De Sousa | F23R 3/60 60/753 |
| 8,141,370 | B2 | 3/2012 | Bulman et al. | |
| 8,454,290 | B2 * | 6/2013 | Schaser | F16B 5/0241 248/576 |
| 8,607,577 | B2 * | 12/2013 | Ruberte Sanchez | F01D 25/00 16/2.1 |
| 9,322,334 | B2 * | 4/2016 | Casavant | F02C 7/20 |
| 10,168,051 | B2 * | 1/2019 | Bloom | F23R 3/50 |
| 2002/0050237 | A1 * | 5/2002 | Becker | F23M 5/04 110/336 |
| 2003/0123953 | A1 * | 7/2003 | Razzell | F01D 25/243 411/419 |
| 2004/0093872 | A1 | 5/2004 | Tiemann | |
| 2004/0255597 | A1 | 12/2004 | Glessner et al. | |
| 2005/0086945 | A1 * | 4/2005 | Tiemann | F23M 5/04 60/800 |
| 2005/0150233 | A1 * | 7/2005 | Glessner | F16B 5/0208 60/796 |
| 2005/0247062 | A1 | 11/2005 | Jeppel et al. | |
| 2006/0101827 | A1 | 5/2006 | Ryan et al. | |
| 2006/0207259 | A1 * | 9/2006 | Holt | F23M 5/085 60/772 |
| 2007/0062202 | A1 * | 3/2007 | Stastny | F23R 3/60 60/796 |
| 2008/0178465 | A1 | 7/2008 | Schiavo et al. | |
| 2010/0266391 | A1 * | 10/2010 | Schlichting | F01D 11/08 415/173.1 |

FOREIGN PATENT DOCUMENTS

| | | |
|---|---|---|
| EP | 1507117 | 2/2005 |
| EP | 1882885 | 1/2008 |
| WO | 2012156186 | 11/2012 |

OTHER PUBLICATIONS

Supplementary European Search Report for Application No. 14832080.7 dated Jun. 21, 2016.

International Search Report and Written Opinion for International Application No. PCT/US2014/047552 dated Nov. 4, 2014.

* cited by examiner

ATTACHMENT SCHEME FOR A CERAMIC BULKHEAD PANEL

TECHNICAL FIELD

The present disclosure relates generally to combustor bulkheads, and more particularly to an attachment scheme for attaching a ceramic panel to a metal combustor bulkhead.

BACKGROUND OF THE INVENTION

Gas turbine engines are generally known and, when used on an aircraft, typically include a fan delivering air into a bypass duct and into a compressor section. Air from the compressor section is passed downstream into a combustion section where it is mixed with fuel and ignited. Products of this combustion pass downstream over turbine rotors driving them to rotate.

Some existing gas turbine engines utilize a metallic bulkhead within the combustion section. The metallic bulkhead is either made as a single integral unit, or assembled from multiple bulkhead panels. Metallic bulkhead panels are coated on an internal surface with a heat resistant coating to resist the extreme temperatures resulting from combustion. In some examples, oxidation of heat resistant coatings can be extreme and shorten the life of the combustor. In order to combat high temperatures, engines have been designed using alternate materials to create the combustor itself or using a liner made from an alternate material within the combustor and affixed to the combustor via fasteners.

SUMMARY OF THE INVENTION

A turbine engine according to an exemplary embodiment of this disclosure, among other possible things includes a compressor section, a combustor in fluid communication with the compressor section, a turbine section in fluid communication with the combustor, the combustor further includes a combustor region defined by at least one bulkhead panel, and at least one heat shielding panel interior to the combustor region, the at least one heat shielding panel is connected to the bulkhead panel via at least one cooled fastener.

In a further embodiment of the foregoing turbine engine, the combustor includes a plurality of bulkhead panels, and each of the bulkhead panels is connected to at least one heat shielding panel via at least one cooled fastener.

In a further embodiment of the foregoing turbine engine, each of the cooled fasteners includes a fastener component defining an axis and including a cooling channel defined within the fastener component, a spring disposed about the fastener and providing axial loading to the fastener, thereby holding the heat shielding panel in place relative to the bulkhead panel.

In a further embodiment of the foregoing turbine engine, the cooling channel includes an opening on a first axial end of the fastener component, and at least one opening on a second axial end of the fastener component.

In a further embodiment of the foregoing turbine engine, the cooling channel includes more than one opening on a second axial end of the fastener component.

In a further embodiment of the foregoing turbine engine, each of the cooled fasteners further includes a cold side bushing disposed about the fastener component and at least partially within the spring, the cold side bushing including a flange member interfaced with the spring.

In a further embodiment of the foregoing turbine engine, the spring further interfaces with the bulkhead panel on an end opposite the flange member.

In a further embodiment of the foregoing turbine engine, each of the cooled fasteners further includes a hot side bushing disposed about the fastener component, the hot side bushing interfaces with the heat shielding panel and a head of the fastener to maintain the heat shielding panel in position relative to the bulkhead panel.

In a further embodiment of the foregoing turbine engine, the hot side bushing is a washer positioned between the bulkhead panel and the heat shielding panel.

In a further embodiment of the foregoing turbine engine, the hot side bushing has an L-shaped cross section and is at least partially positioned in a fastener hole in the bulkhead panel.

In a further embodiment of the foregoing turbine engine, the bulkhead panel is metal and the heat shielding panel is a ceramic material.

In a further embodiment of the foregoing turbine engine, a stem of each of the cooled fasteners extends through an oversized fastener hole in the bulkhead panel and a hole in the heat shielding panel.

In a further embodiment of the foregoing turbine engine, the hole is shaped such that a head of the fastener component interfaces with the shaped hole.

A fastener according to an exemplary embodiment of this disclosure, among other possible things includes a fastener component defining an axis and including a cooling channel defined within the fastener component, a spring disposed about the fastener and providing axial loading to the fastener, thereby holding a second panel in place relative to a first panel.

In a further embodiment of the foregoing fastener, the cooling channel includes an opening on a first axial end of the fastener component, and an opening on a second axial end of the fastener component.

In a further embodiment of the foregoing fastener, each of the cooled fasteners further comprises a cold side bushing disposed about the fastener component and at least partially within the spring, the cold side bushing including a flange member interfaced with the spring.

In a further embodiment of the foregoing fastener, each of the cooled fasteners further comprises a hot side bushing disposed about the fastener component, the hot side bushing is operable to interface with a first panel in conjunction with a head of the fastener interfacing with the first panel, thereby maintaining a position of the first panel relative to a second panel.

In a further embodiment of the foregoing fastener, the cooled fastener further includes a retainer operable to axially load the spring.

A method for cooling a fastener according to an exemplary embodiment of this disclosure, among other possible things includes receiving a fluid impinging on a first end of a fastener into a cooling channel defined within the fastener, the fluid is cool relative to a surface on at least one end of the fastener, and passing the fluid through the cooling channel, thereby internally cooling the fastener.

In a further embodiment of the foregoing method, the step of receiving the fluid impinging on the first end of the fastener into the cooling channel defined within the fastener includes receiving air exiting a compressor section of a turbine engine and impinging upon a combustor section of the turbine engine.

In a further embodiment of the foregoing method, the step of passing the fluid through the cooling channel further includes expelling the fluid into a combustor of a turbine engine.

These and other features of the present invention can be best understood from the following specification and drawings, the following of which is a brief description.

DETAILED DESCRIPTION OF AN EMBODIMENT

Figure 1:
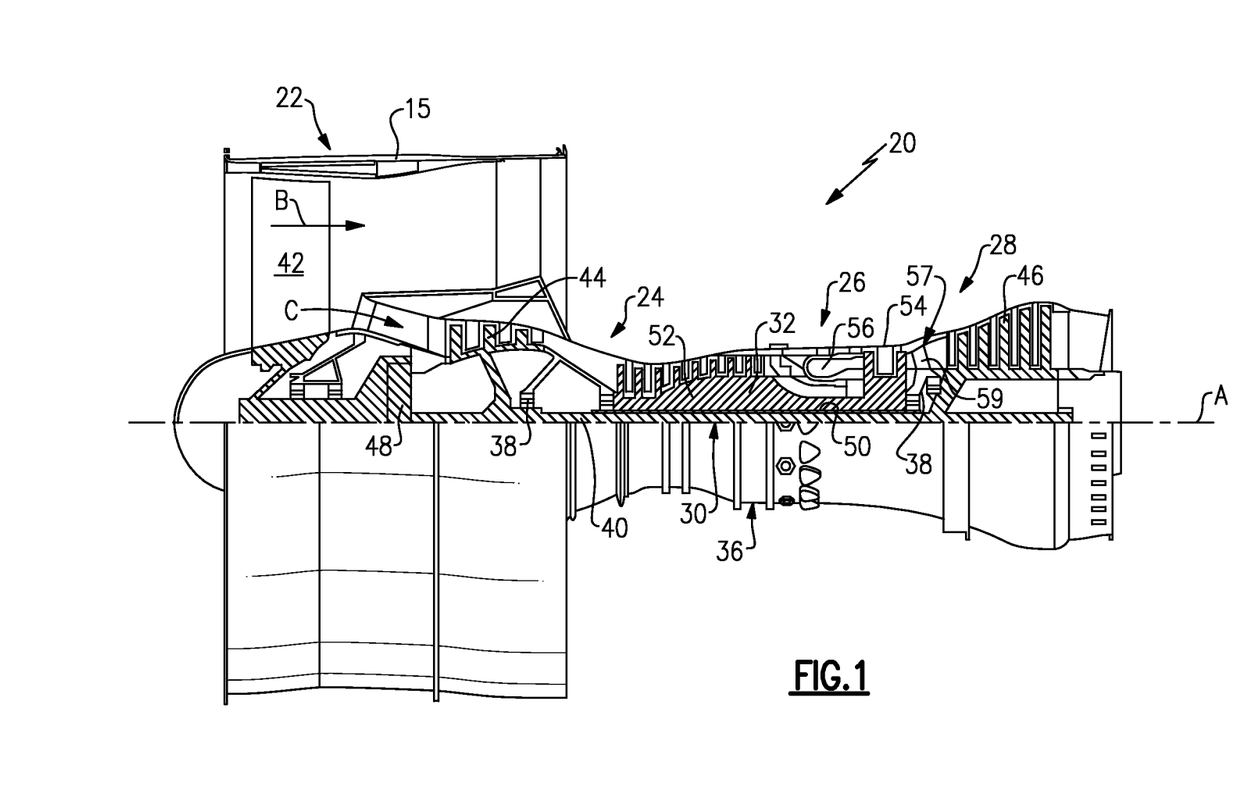
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
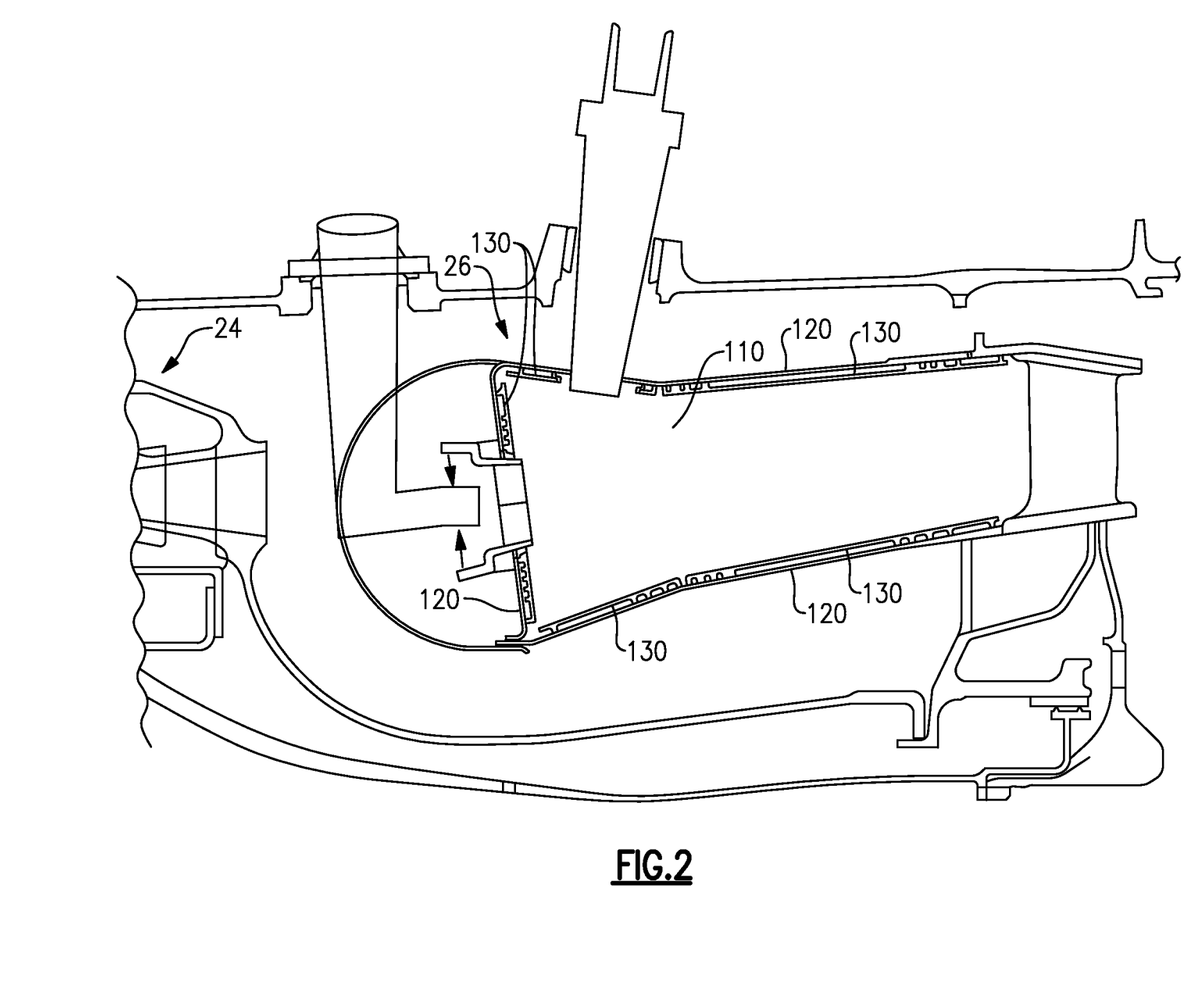
FIG. 2 schematically illustrates a combustor section of the gas turbine engine of FIG. 1 in greater detail.

FIG. 2 schematically illustrates the combustor section 26 of the gas turbine engine of FIG. 1 in greater detail. The combustor section 26 includes a combustion region 110 in which fuel is combusted. The combustor section 26 is defined by a combustor bulkhead 120 that is constructed of multiple metal panels. The metal panels are connected to each other using known fastening means. Lining the combustor bulkheads 120, within the combustion region 110, are multiple ceramic heat shielding liners 130. The ceramic heat shielding liners 130 are connected to the corresponding metal bulkhead section 122 via one or more cooled fastener (described below with regards to FIGS. 3-5).

During operation of the turbine engine 20, compressed air from the compressor section 24 passes around the combustor section 26 and impinges on an external surface of the combustor bulkhead. Due to the extreme heat generated within the combustor 56, the gas exiting the compressor section 24 and impinging upon the combustor 56 is cool relative to the temperatures in the combustor 56. A portion of the relatively cool air from the compressor section 24 is passed through a channel in the cooled fasteners, and thereby provides a cooling effect to the fasteners.

As a further result of the extreme heat within the combustor 56, the metal bulkhead sections 122 undergo expansion and contraction over the operation cycles of the turbine engine 20. The placement of the ceramic heat shielding liners 130 reduces the amount of expansion and contraction experienced by the metal bulkhead sections 122, but does not eliminate it. The heat shielding liners 130 also expand and contract. However, since the heat shielding liners are not constrained, additional stresses from the bulk expansion of the metal bulkhead sections 122 are not imparted onto the heat shielding liners 130.

Improper joining of the ceramic heat shielding liners 130 to the metal bulkhead sections 122 can result in stresses being applied to the ceramic heat shielding liners 130 at the joint between the metal bulkhead 120 and the ceramic heat shielding liners 130. These stresses can generate cracks or other faults within the ceramic heat shielding liners 130 thereby reducing the effective lifespan of the ceramic heat shielding liners 130.

Figure 3:
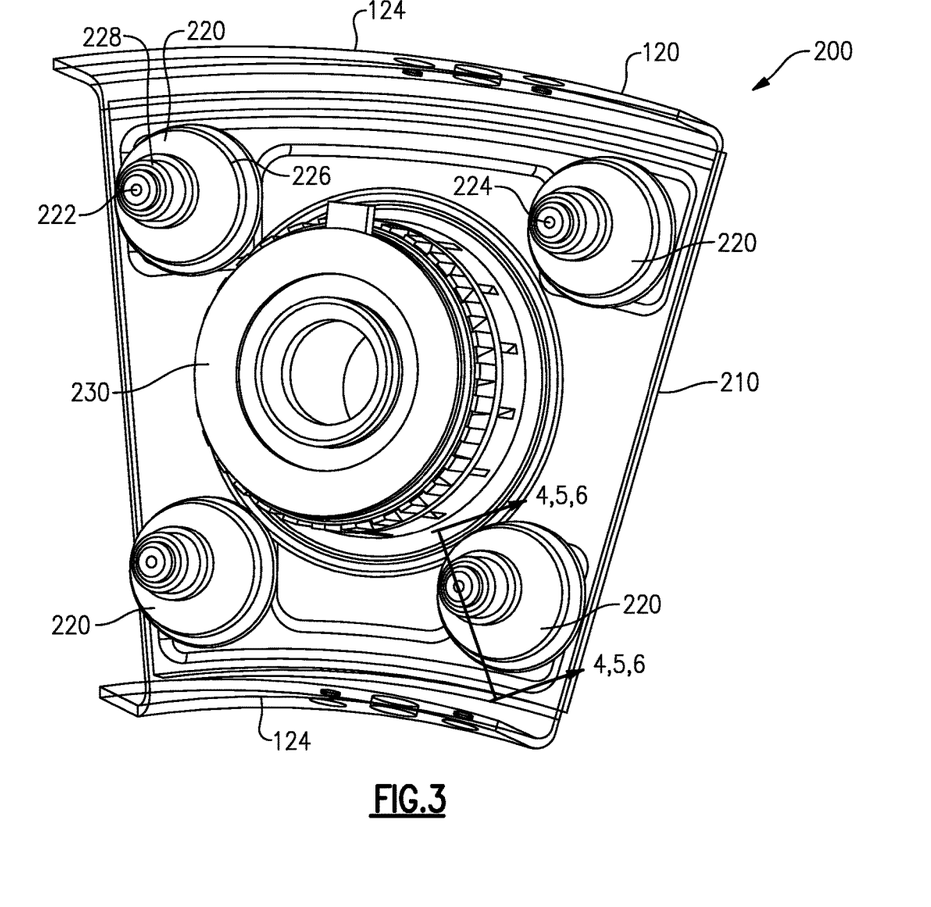
FIG. 3 schematically illustrates a front looking aft view of one section of a combustor bulkhead.

With continued reference to FIG. 2, FIG. 3 schematically illustrates a front looking aft view of one section 200 of a combustor bulkhead 120. The bulkhead 120 is attached to a ceramic heat shielding liner 210 by four cooled fastener assemblies 220. Located within the center of the section 200 is a swirler 230. In alternate combustor bulkhead sections 200 the swirler 230 is omitted. Each of the metal bulkhead sections 122 includes flanges 124 for connecting the bulkhead 120 to adjacent metal bulkhead sections 122 and framing the combustor assembly.

The cooled fasteners 220 include a fastening component 222 that protrudes through the metal bulkhead 120 and through the ceramic heat shielding liner 210 and fastens the two together. Extending axially through the fastener component 222 is a cooling channel 224 (such as a through hole) that provides a cooling air passage through the fastener component 222, thereby allowing the fastener component 222 to be internally cooled by the relatively cool compressor air impinging on the exterior of the metal bulkhead section 122. In some examples, the fastener component 222 is a bolt. In some examples, the fastener component 222 includes a counter hold feature on an external end of the fastener component 222, thereby facilitating easy installation and removal of the corresponding ceramic heat shielding liner 210.

A cup style spring 226 is disposed around the fastener component 222 and interfaces with a retainer 228, such as a nut and the metal bulkhead 120, or other feature of the cooled fastener 220 and the metal bulkhead 120, to provide an axial loading on the fastener component 222, relative to an axis defined by the fastener component 222, when the cooled fastener 220 is fully installed. The retainer 228 in some examples is a standard threaded nut, although it is understood that alternate designs in place of the nut/bolt arrangement can also be used for the cooled fastener 220 to the same effect.

Figure 4:
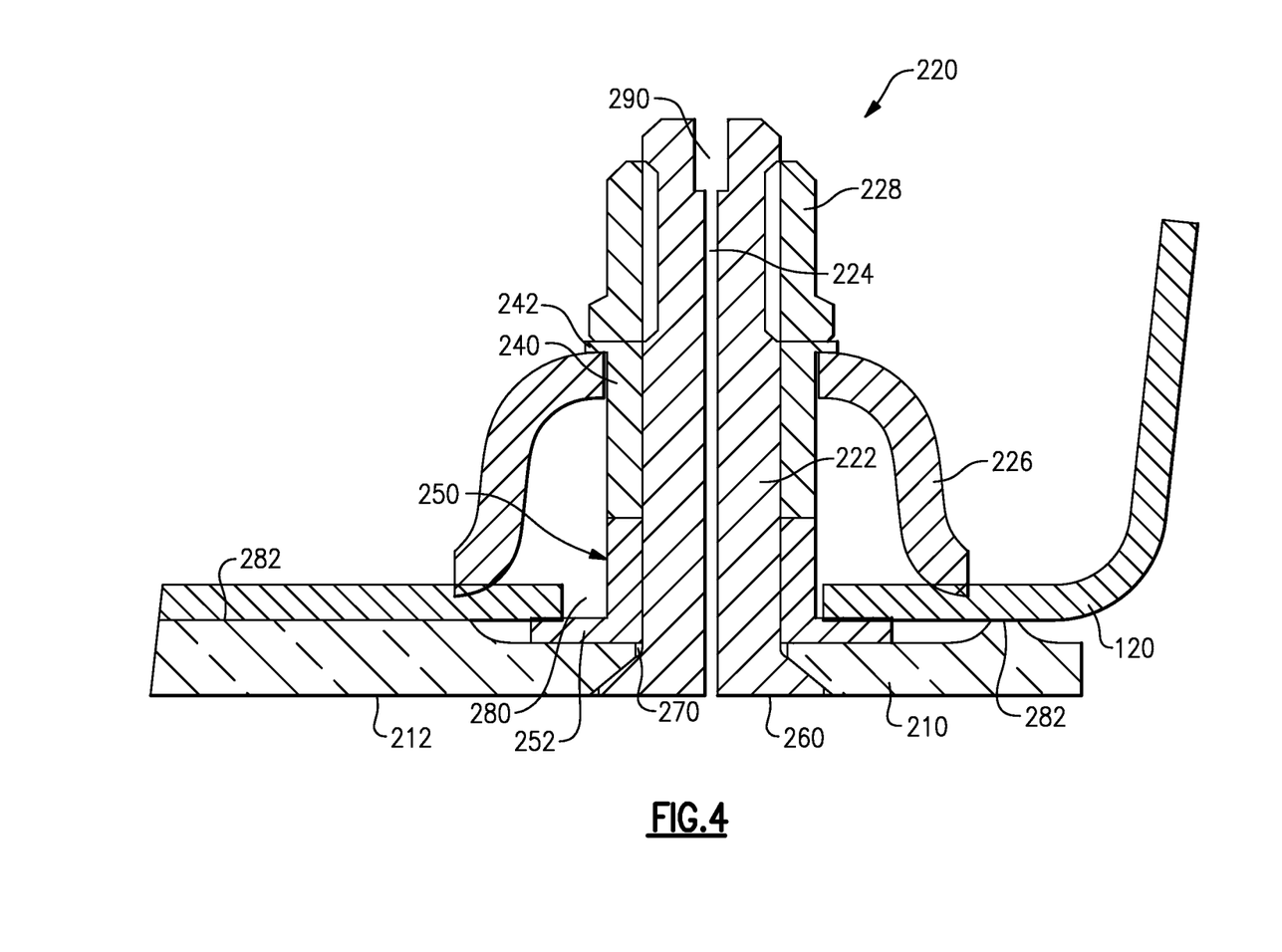
FIG. 4 schematically illustrates a cross sectional view of an example fastener.

With continued reference to FIG. 3 and with like numerals indicating like elements, FIG. 4 schematically illustrates cross section of one example cooled fastener 220 cut along view line B-B. As described above with regards to FIG. 3, the cooled fastener 220 includes a fastener component 222 that defines an axis and extends through the metal bulkhead section 122 and the ceramic heat shielding liner 210. The fastener component 222 includes a cooling channel 224 extending along the axis defined by the fastener component 222 and through the cooled fastener 220. In some examples, the fastener component 222 includes a counter hold feature 290 on an exterior end to aid in the assembly of the cooled fastener 220. While the illustrated example shows a cooling channel 224 aligned with the axis of the fastener component 222, alternate examples can use non linear cooling channels or cooling channels arranged skew to the axis.

In the illustrated example of FIG. 4, the retainer 228 does not directly interface with the cup spring 226, as in the example of FIG. 3. Rather, the retainer 228 interfaces with a cold side bushing 240. The cold side bushing 240 circumferentially surrounds the fastener component 222 and includes a flange 242 extending radially away from the fastener component 222. The flange 242 interfaces with the cup spring 226. As the retainer 228 is tightened, the flange 242 pushes against and compresses the cup spring 226. The compression causes the cup spring 226 to provide the axial loading on the cooled fastener 220 as described above. The axial loading, in turn, holds the ceramic heat shielding liner 130 against the metal bulkhead 120, thereby maintaining the relative positions of the ceramic heat shielding liner 130 and the metal bulkhead 120.

Also disposed circumferentially about the fastener component 222 is a hot side bushing 250. The hot side bushing directly contacts the ceramic heat shielding liner 210, and combined with a fastener component head 260 holds the ceramic heat shielding liner 210 in place due to the axial loading of the spring 226. The hot side bushing 250 has an L-shaped cross section and includes a flange portion 252 that extends between the ceramic heat shielding liner 210 and the metal bulkhead section 122.

The ceramic heat shielding liner 210 includes a hole 270 that is sized to fit the fastener component head 260 such that when the fastener component 222 is fully installed, the head 260 is flush with an interior surface 212 of the ceramic heat shield liner 210. The hole 270 in the ceramic heat shield liner 210 also includes a countersunk portion designed to interface with the head 260. The hole 270 is sized at its smallest diameter to fit a stem of the fastener component 222 with minimal excess space. While the illustrated example shows an angled countersunk hole 270 and an angled fastener component head 260, it is understood that alternate shaped countersinking and fastener component heads 260 can be utilized to the same effect.

Similarly, a through hole 280 corresponding to the cooled fastener 220 is located in the metal bulkhead section 122. The through hole 280 in the metal bulkhead section 122 is oversized relative to a stem of the fastener component 222 and a diameter of the hot side bushing 210. By making the through hole 280 oversized, the metal bulkhead section 122 is provided with room for thermal expansion and contraction without imparting mechanical stresses on the ceramic heat shielding liner 210 as a result of the thermal expansion and contraction of the metal bulkhead section 122.

During practical operation of the turbine engine 20, the metal bulkhead will expand and contract along with the heat cycles of the turbine engine 20 causing the metal bulkhead to shift along contact points 282 between the metal bulkhead 120 and the ceramic heat shielding liner 210.

As a further consideration to assembly, the cold side bushing 240 and the hot side bushing 250 are separate components that contact each other when the cooled fastener 220 is assembled. As the retainer 228 is tightened, the cold side bushing 240 and the hot side bushing 250 are forced together and prevent the spring form being tightened beyond a certain stiffness. By utilizing this arrangement, the physical configuration of the cooled fastener 220 prevents a technician installing the ceramic heat shielding liner 210 from inadvertently over tightening the cooled fastener 220 and thereby cracking or otherwise damaging the liner 210.

Figure 5:
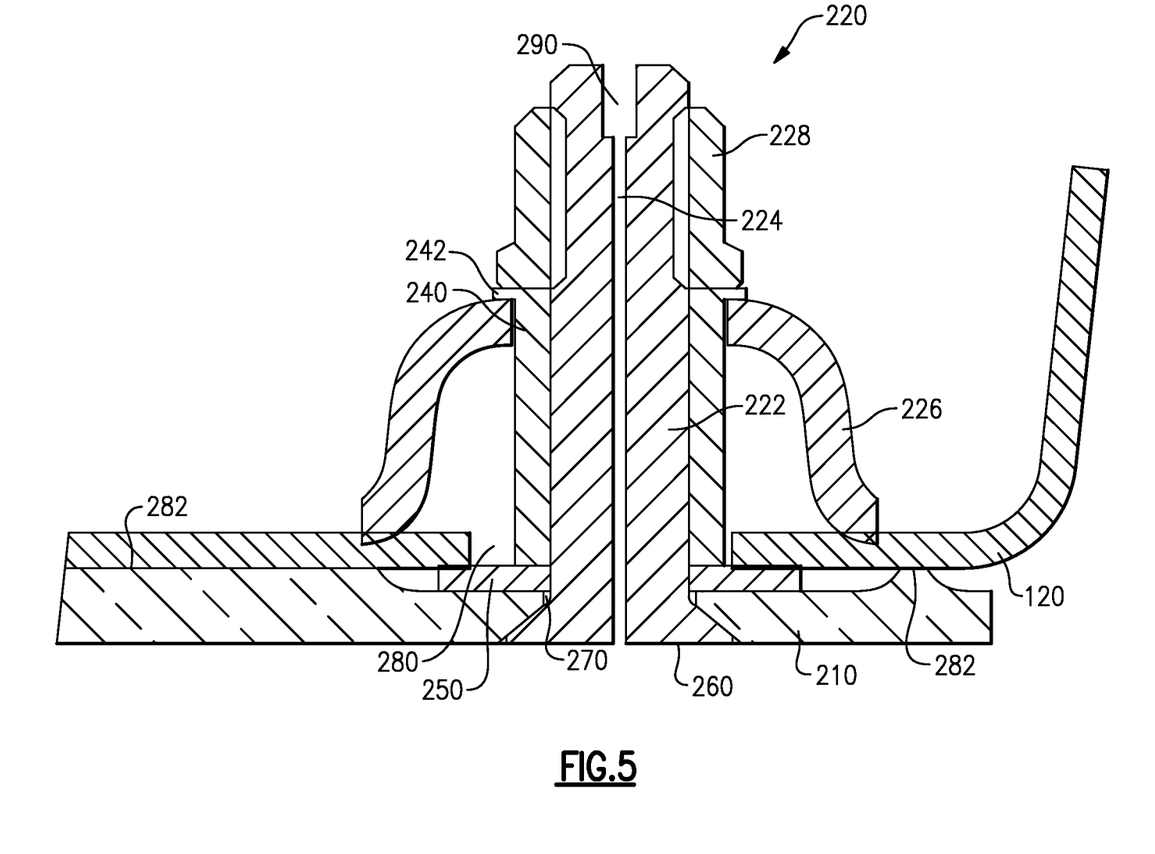
FIG. 5 schematically illustrates a cross sectional view of an alternate example fastener.

With continued reference to FIG. 4, FIG. 5 illustrates an alternate example cooled fastener 220 with like numerals indicating like elements. With the exception of the cold side bushing 240 and the hot side bushing 250, the alternate example assembly is identical to the assembly of FIG. 4, and functions in the same manner. In the alternate example cooled fastener 220 of FIG. 5, the cold side bushing 240 extends into the oversized hole 280 in the metal bulkhead 120 and contacts a washer that functions as the hot side bushing 250. The alternate example provides the advantage of allowing for fewer custom designed components by replacing the hot side bushing of the example of FIG. 4 with a standard washer.

With continued reference to the examples of both FIG. 4 and FIG. 5, the head 260 of the fastener component 222 is flush with the interior surface of the ceramic heat shielding liner 210. The surface of the head 260 can be treated with a heat resistant coating to further improve the lifespan of the cooled fastener 220.

In order to provide cooling to the fastener component 222, air from the compressor section impinges on the outside of the metal bulkhead 120 as described above and enters the cooling channel 224 of the cooled fastener 220 via an opening in the counter hold portion 290. The cooled air is cool relative to the air internal to the combustor region 110 and provides a cooling effect to the fastener component despite the elevated temperatures of the air exiting the compressor section 24 relative to the air entering the compressor section 24.

Figure 6:
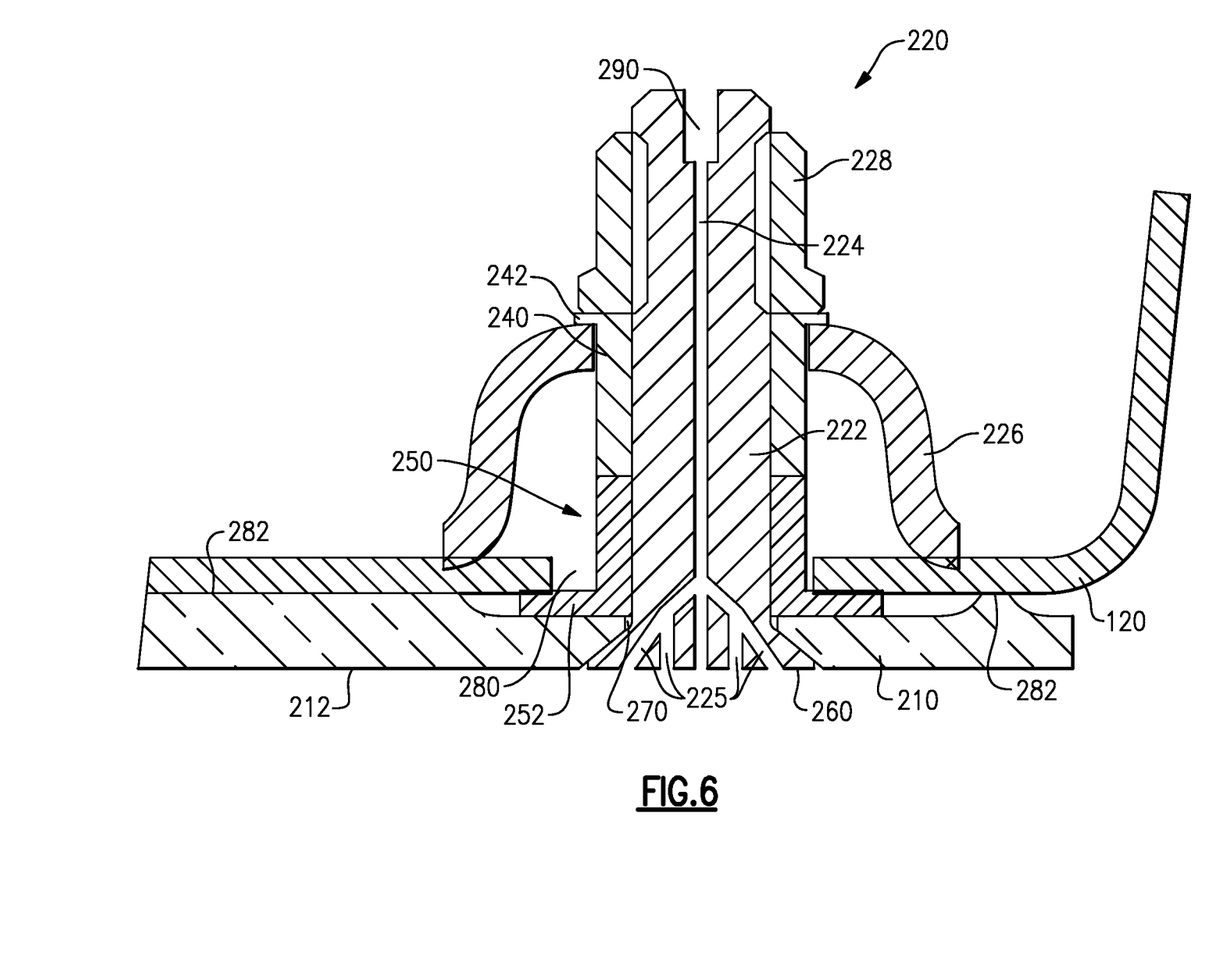
FIG. 6 schematically illustrates a cross sectional view of another alternate example fastener.

With continued reference to FIGS. 4 and 5, and with like numerals indicating like elements, FIG. 6 schematically illustrates a cross sectional view of another alternate example fastener. The alternate example of FIG. 6 is fundamentally the same as the example of FIG. 4, with the exception of the cooling channel 224. In the alternate example of FIG. 6, the cooling channel 224 diverges into multiple cooling branches 225 as the cooling channel 224 enters the fastener component head 260. The multiple branches distribute the cooling air passing through the cooling channel 224 about the fastener component head 260 allowing for even cooling of the fastener component head 260. In the alternate example, each of the branches 225 includes a corresponding opening in the fastener component head 260 through which the cooling air is expelled.

In yet further alternate examples, the cup shaped spring component 226 can be replaced by any general spring component surrounding the fastener component 222 and the hot and cold bushings 240, 250 provided the alternate spring component provides the axial loading required to maintain the fastener component 222, the ceramic heat shielding liner 210 and the metal bulkhead 120 is the correct relative positions.

Furthermore, while the instant disclosure illustrates a foremost bulkhead section including a ceramic heat shielding liner, it is understood that in some example turbine engines, additional liner sections within the combustor region 110 can be constructed of a ceramic heat shielding and fastened to the metal bulkheads in a similar manner.

In yet more alternate examples, the number of cooled fasteners utilized to attach the ceramic heat shielding liner to the metal bulkhead is not limited to four, but can be any number of fasteners appropriate for the shape and dimensions of the ceramic heat shielding liner and the corresponding metal bulkhead.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine comprising:
a compressor section;
a combustor in fluid communication with the compressor section;
a turbine section in fluid communication with the combustor;
said combustor further comprises a combustor region defined by at least one bulkhead panel, and at least one heat shielding panel interior to said combustor region, wherein a first heat shielding panel of said at least one heat shielding panel is connected to a first bulkhead panel of said at least one bulkhead panel via at least one cooled fastener; and
the at least one cooled fastener comprises a fastener component defining an axis and including a cooling channel defined within the fastener component, a spring disposed about said at least one cooled fastener and providing axial loading to said at least one cooled fastener, thereby holding said first heat shielding panel in place relative to said first bulkhead panel, a cold side bushing disposed about said fastener component and at least partially within said spring, the cold side bushing including a flange member interfaced with said spring, and a hot side bushing disposed about said fastener component, wherein the hot side bushing interfaces with the first heat shielding panel and a head of the at least one cooled fastener to maintain the first heat shielding panel in position relative to the first bulkhead panel.

2. The turbine engine of claim 1, wherein said combustor comprises a plurality of bulkhead panel including the first bulkhead panel, the at least one cooled fastener comprises a plurality of cooled fasteners, the at least one heat shielding panel comprises a plurality of heat shielding panels including the first heat shielding panel, and wherein each of said bulkhead panels of the plurality of bulkhead panels is connected to at least one heat shielding panel of the plurality of heat shielding panels via at least one cooled fastener of the plurality of cooled fasteners.

3. The turbine engine of claim 1, wherein said cooling channel includes an opening on a first axial end of the fastener component, and at least one opening on a second axial end of the fastener component.

4. The turbine engine of claim 3, wherein said cooling channel includes more than one opening on the second axial end of the fastener component.

5. The turbine engine of claim 1, wherein said spring further interfaces with said first bulkhead panel on an end opposite said flange member.

6. The turbine engine of claim 1, wherein A said hot side bushing is a washer positioned between said first bulkhead panel and said first heat shielding panel.

7. The turbine engine of claim 1, wherein said hot side bushing has an L-shaped cross section and is at least partially positioned in a fastener hole in said first bulkhead panel.

8. The turbine engine of claim 1, wherein said first bulkhead panel is metal and wherein said first heat shielding panel is a ceramic material.

9. The turbine engine of claim 1, wherein a stem of each of said cooled fasteners extends through an oversized fastener hole in said first bulkhead panel and a hole in said first heat shielding panel.

10. The turbine engine of claim 9, wherein said hole is shaped such that a head of said fastener component interfaces with the shaped hole.

* * * * *